Figures 1, 2:
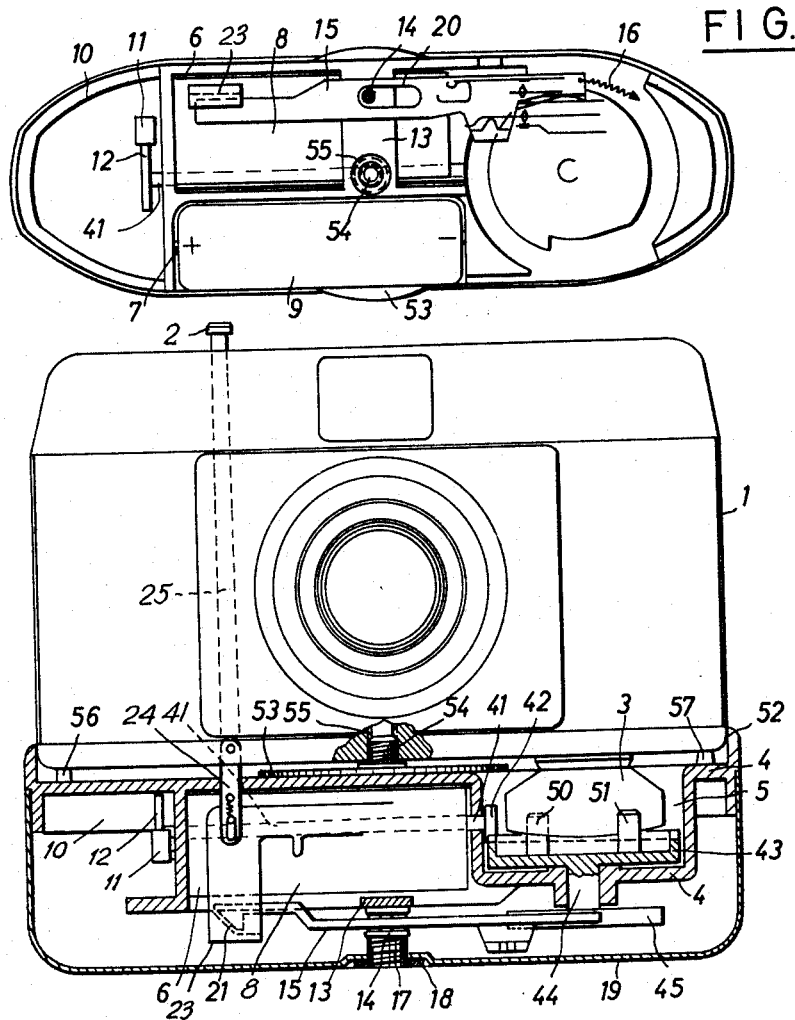

Jan. 28, 1964  K. H. LANGE ETAL  3,119,315
PHOTOGRAPHIC CAMERAS
Filed Dec. 22, 1959  3 Sheets-Sheet 1

INVENTORS:
KARL HEINZ LANGE
WILHELM LANGEWIESCHE
GIESBERT BOKE
By
MAXWELL E. SPARROW
Attorney

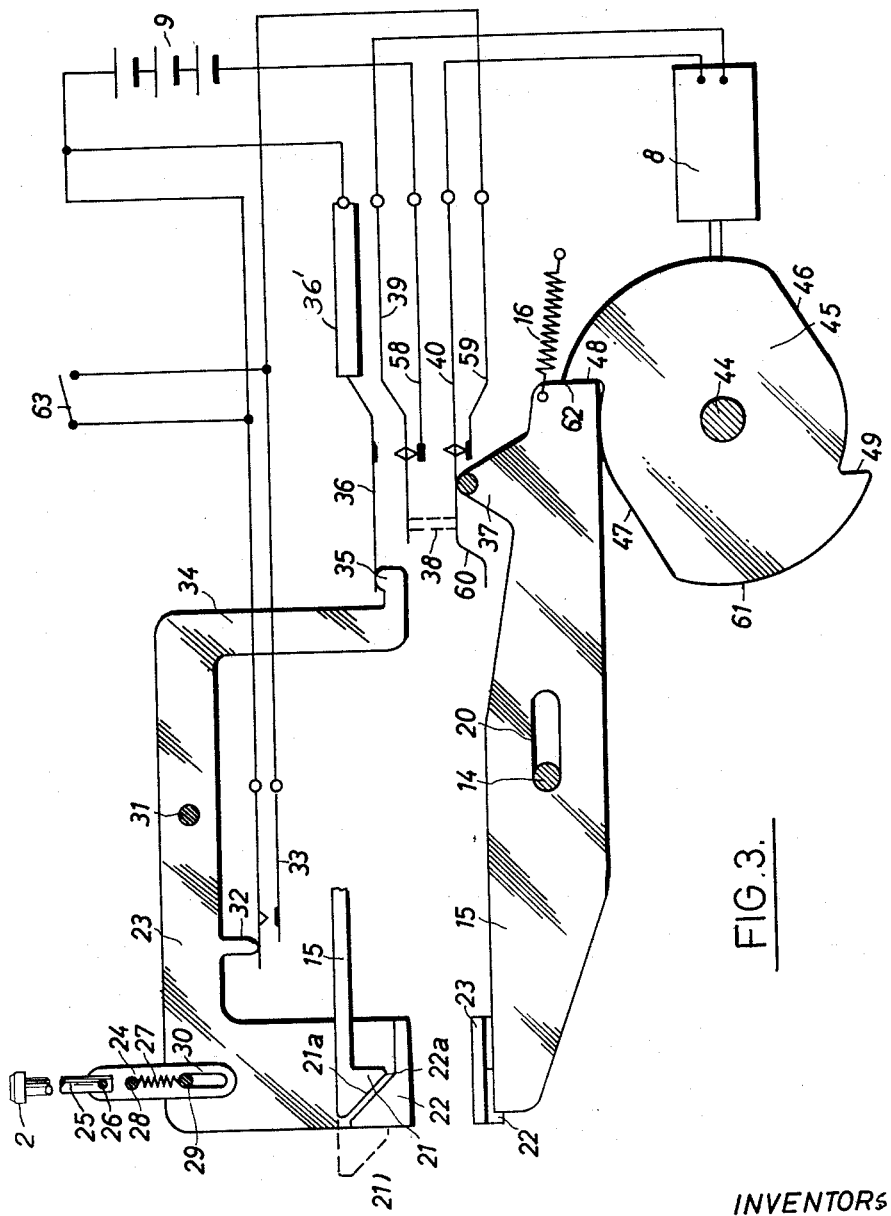

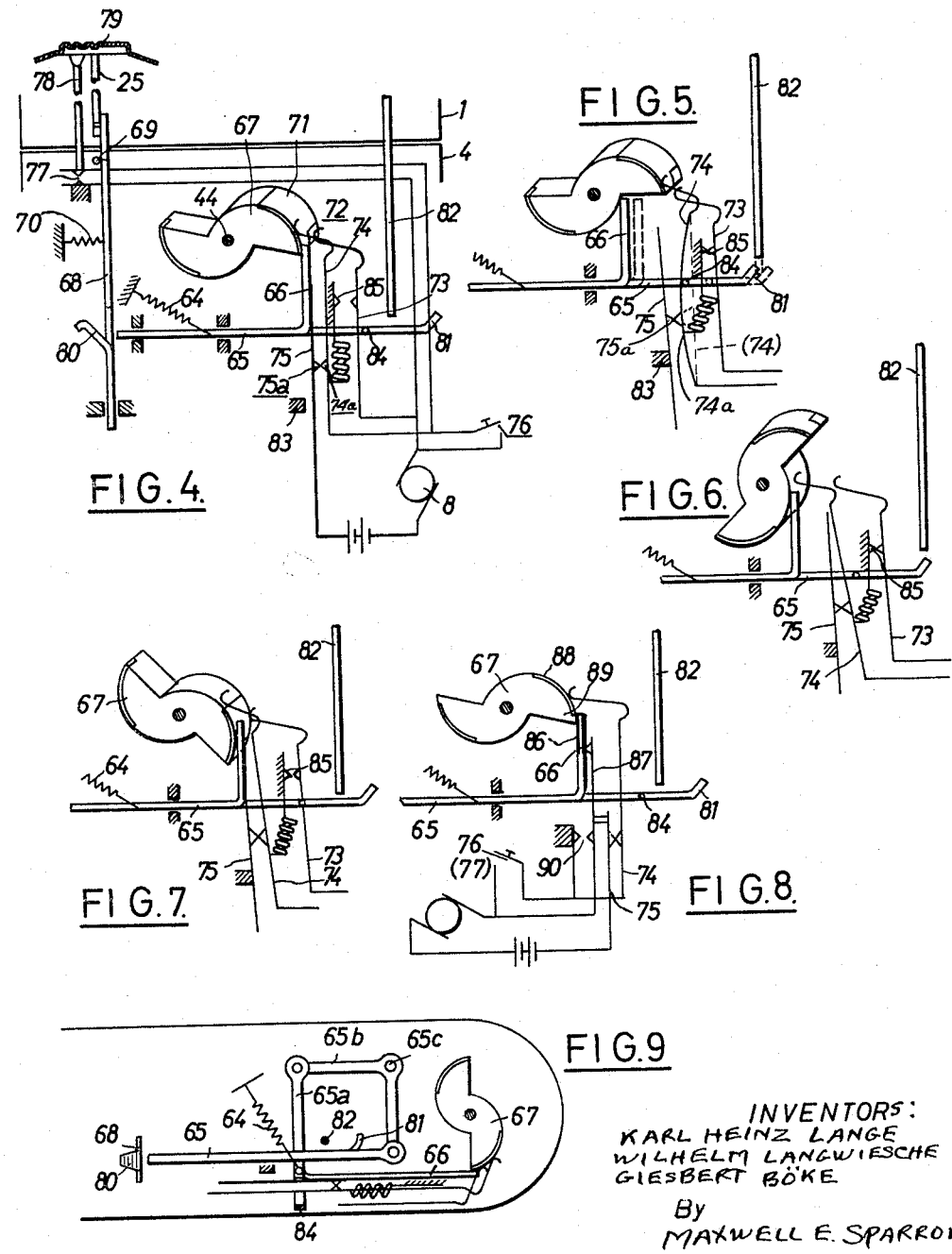

United States Patent Office 3,119,315
Patented Jan. 28, 1964

3,119,315
PHOTOGRAPHIC CAMERAS
Karl Heinz Lange, Bunde-Ennigloh, Westphalia, Wilhelm Langewiesche, Regensburg, and Giesbert Boke, Bunde, Westphalia, Germany, assignors to Balda-Kamerawerk Rudolf Gruter, Kommanditgesellschaft, Bunde, Westphalia, Germany, a company of Germany
Filed Dec. 22, 1959, Ser. No. 861,249
Claims priority, application Germany Dec. 27, 1958
13 Claims. (Cl. 95—31)

The present invention relates to a supplementary device for photographic cameras, preferably for a camera as described in German patent application No. B45,473 or German Petty Patent No. 1,769,293, for the purpose of undertaking the release and winding function with the assistance of a single electric motor wherein the possibility exists of initiating the release process selectively by hand through the release mechanism existing in the camera or by remote operation through a two-pole cable and simple closure contact. The winding process then always automatically follows the release process and by a continuous closure of the contacts at the end of the two pole cable the releasing and winding process is repeated so that it is possible in the simplest manner to effect in rapid succession both individual and series photographs by hand as well as by remote operation. Obviously it is also possible to use the present invention not as a supplementary instrument but equally to build it into the camera though equally also the use of the supplementary device directly in communication with the cameras mentioned in the above-mentioned other patent application ensures special advantages.

The type of camera mentioned in the earlier applications includes in particular a rapid transfer handle, which is fixed to the under part of the camera and provides a rotation of 180° in order to transfer the film, to open the shutter and also to connect the counting mechanism.

Cameras with motor winding are known in themselves. Former devices of this kind operate in that with the assistance of several contacts connected in series and parallel after each release of the film carrier and the tensioning of the winder effected by motor, actuation was only possible by hand. There exists, however, a considerable requirement to use cameras with motor winding and also with remote actuation. The essential novelty of the present invention accordingly resides in that in a camera with motor winding in addition to a mechanical release means there is also provided a mechanical connection between the winding drive and the release means so that actuation can take place selectively by hand or with the assistance of the winding drive through an electric or remotely operated contact. Furthermore, it may be desirable also to permit the mechanical release means to act on an electrical contact which is already operated at the commencement of the mechanical actuation movement and then automatically gives rise to the release operation through the release drive. This is also possible in accordance with the invention. In an advantageous embodiment the winding motor is directed rearwardly during the release process, wherein the winding drive is out of engagement, whilst the full power of the motor is at disposal for the operation of the release mechanism. When actuation has been completed there follows a renewed reversal of the direction of rotation and the carrying out of the winding process.

In another embodiment the re-direction control of the motor is avoided and this is stopped only during the release operation and actuation is effected with the assistance of a loaded mechanical power storage (spring) in front of the motor, whereupon after termination of the diaphragm closure the motor again commences to run, film transfer, the tensioning of the shutter and the loading of the mechanical power storage are effected.

These embodiments likewise make it possible to avoid all dead time and to attain a highest possible number of series of exposures in a given period of time.

Further details and advantages of the invention are explained in more detail in relation to the accompanying drawings which describe some embodiments.

In the drawings:

FIGURE 1 is a front view of a camera having a supplementary motor device in accordance with the invention, the motor device being shown in section, FIGURE 2 is a view from below of the supplementary device after removal of the protective cap, FIGURE 3 is a plan of the most important mechanical and electrical connections, FIGURE 4 is a plan partially in perspective representation of a second embodiment of the invention, FIGURES 5 to 7 each shows a portion taken from FIGURE 4 with the corresponding positions of the switch member during the individual stages of a complete operational cycle, FIGURE 8 shows a variation of the examples of FIGURES 4 to 7 and FIGURE 9 is a schematic built in plant of the contacts and mechanical transmission means.

In the drawings 1 is a camera casing which encloses a camera with rapid winder and release catch, the details of which correspond to those of German patent application No. 45,473. The device, which comprises both a rapid winder and a release catch, is so designed that with the operating means in the upper part of the camera, only the release knob 2, which may also be arranged on the front of the camera is present, while a winder key 3 for rapid winding is arranged on the underside of the camera. The return spool lever which is folded below the surface when not in use plays no special role in the existing arrangement and is, therefore, omitted in the drawings.

A supplementary casing 4 is affixed to the underside of the camera casing 1, this casing 4 having a pot-like recess 5 as well as two chamber-like recesses 6 and 7, which house the motor 8 and the battery 9 respectively. The gears 11 and 12 of a gear transmission are contained in a further chamber 10.

The recess or chamber 6 is partially covered by a bridge 13 on which are fixed a bearing pin 14, which supports the switch lever 15 and the supporting screw-nut 17, the lever 15 being forced by the spring 16 into the position shown in FIG. 2. The supporting screw-nut 17 has external threads on which can be screwed a ring nut 18 for securing the protective cap 19. The switch lever 15 has a longitudinal slot 20, which permits the longitudinal displacement and the rotation of the switch lever 15, and a sloping angled hook-shaped end 21 which co-operates with the head 22 at one end of a release rocking arm 23, the left end of which in FIGURE 3, is moved downwards on displacement of the switch lever 15 against the direction of pull of the spring 16 (FIG. 2) and thereby carries with it through an intermediate arm 24 the release rod 25 which is actuated by the knob 2 of the main camera. The intermediate arm 24 is linked to the release rod 25 at 26. The connection with the release rocking arm 23 is by a spring 27 one end of which is secured at 28 to the release arm 24 whilst the other end leads to a pin 29 of the rocking arm 23. The pin 29 at the same time engages a guide slot 30 of the intermediate arm 24. The release rocking arm 23 is pivotally mounted at 31 and operates an electrical contact 33 by means of a nose-piece 32. Furthermore, at one end of the release rocking arm 23 a collector arm 34 is provided which engages from time to time by means of a nose-piece 35 the contact spring 36 which may yield resiliently in two perpendicularly related directions.

A nose-piece 37 likewise is fixed on the control arm 15, this nose-piece serving for operation of the control contact arms 39 and 40 mechanically connected with one another through an insulating rod 38.

In the upper portion of FIGURE 3 there is shown the release device (release intermediate arm 24, rocking arm 23, including the hook-shaped end 35 and the left end of the control arm 15 shown in FIG. 1, broken away, whilst in the lower part of the figure there is shown the entire control arm 15 and a notched disc 45 engaging with same as shown in FIG. 1.

The movement of the motor 8 (see FIGURES 1 and 2) is transmitted by gears 11 and 12, a shaft 41 and a pinion 42 to a pot-shaped crown wheel 43. The latter is supported by the shaft 44 in the pot-shaped recess 5 of the casing 4 and is secured on the other side by the notched disc 45 with which it is fixedly connected. The notched disc has two cam surfaces 46 and 47 and two steps or abutments 48 and 49 which are rotated during one cycle through 180° and act on the lever 15. Two pins 50 and 51 are riveted in the base of the crown wheel 43 and engage the winder key 3 of the camera 1 in the direction of the rotation of the former.

The casing has a raised edge 52, which corresponds exactly to the lower contour of the camera 1 and is attached to the camera. A disc 53 extends over the edge 52 of the casing 4 on both longitudinal sides thereof and is riveted to a threaded pin 54 which can be screwed into the support screw nut 55 of the camera 1 and provides a firm connection between the camera and the motor supplement.

The vertical spacing between the casing 1 and the motor supplement is effectuated by the two ribs 56 and 57. As will be seen the supplementary casing 4 can be very simply attached and removed without removing any camera parts, knobs or the like.

In the indicated position (FIGURE 3) the contact arm 39 makes electrical contact with a counter contact 40 arm 58, and contact arm 40 with a counter contact arm 59. Thus the circuit for the motor is prepared with a determined polarity but is still interrupted at the switch 33. If the release rod 25 is now operated by hand, the contact 33 is closed in the first part of the path and the motor 8 is set in motion in the direction so that the control arm 15 lies with its rearward end against the step 48 and is pressed by this to the left in FIGURE 3 wherein it is guided with the slot 20 on the pin 14. When the motor is running in this direction, the pins 50 and 51 move less than 180° during this time interval and are out of contact with the winder key so that no winding or rewinding can take place. The cam 21a at the end of control arm 15 thus slides over the cam 22a at the left end of the release rocker arm 23, until the hook-shaped end 21 after the rocker arm 23 and the release rod 25 snaps back engages behind the head 22. In this position the control arm 15 is locked. At the same time the nose-piece 37 of the control arm 15 through the action of the cam 60 of the contact arm 40 has shifted the contact arms 40 and 39. As a result thereof the direction of the rotation of the motor is reversed. When the pins 50, 51 engage again the winder key 3, the winding process is started. The reverse switching is favoured by the inertia of the motor so that a short interruption of the current during the switching process is ineffective. In this reverse motor operation the right end of the control arm 15 is raised by the cam 47, of the notched disc 45, until the left end of the control level 15 passes laterally over the head 22 of the release rocker arm 23, and is drawn by the spring 16 toward the right until this movement is terminated by the end of the slot 20 on the pin 14. While the motor continues running in the same direction, the right end of the control lever 15 lies on the segment 61 of the disc 45 which has the largest diameter and accordingly remains there during the rotation of the disc 45. The nose piece 37 forces the contacts 40, 39 to make contact with contacts 58 or 36, until the right end of the control arm 15 springs behind the step 49 and accordingly reverses the motor current and at the same time interrupts it inasmuch as contact 33 is interrupted or the release rod 25 is no longer operated by hand. However, when during the release action the hand remains on the knob 2 of the rod 25, arm 34 with its nose-piece 35 prevents the motor from running in the winding direction by lifting the contact 36 out of the range of the contact spring 39. This occurs either through additional lifting by mechanical linkage or swinging laterally out of the plane of the drawing. Since the plan of movement of the control arm 15 and the rocking arm 23 are arranged at a right angle, the described lateral swinging action may be advantageous. This is schematically indicated by a flat spring portion 36′, so that the entire contact arm consisting of 36 and 36′ can move in both directions, perpendicular to one another. Referring to FIGURE 3, it will be seen that contact spring 36, 36′ is an integral member comprising two flat portions positioned perpendicularly to each other, the spring being shaped similarly to a twisted leaf spring wherein one end has been twisted 90° relative to the other.

A switch 63 can be arranged parallel to the contact 33. If the former remains closed, then the operating cycle repeats continuously so that an automatic series of photographs are taken.

In the example illustrated in FIGURES 4 to 7, action is taken from the winding mechanism not, however, directly by the motor but by a power source in the form of a spring 64 which endeavours to draw the release control arm 65 to the left in the release direction. The tensioning of the spring 64 is effected with the assistance of a side arm 66 of the control arm 65 by means of a cam 67 which consists of two equal halves arranged at 180°, corresponding to the pattern of the camera, in which a complete winding movement through 180° rotation of the winder key 3 (FIGURE 1) is effected. The cam 67 corresponds to the notched disc 45 in FIGS. 1 to 3 and has pins (not shown in the schematic FIGURES) similar to pins 50, 51 on the disc 45 for engaging the winder key 3. In contingent freedom the control arm 65 slides to the left under the action of the spring in FIGURE 4. For the purpose of actuation, just as in the first described example, the release rod 25 inside the camera housing 1 is in engagement with an extension rod 68 which projects through the supplementary casing 4. The rod 68 can have a hinge at 69 in order to fold it in when not in use and to permit withdrawal into the housing 4. The rod 68 is drawn to the left by means of a spring 70 so that the engagement with the release rod 25 remains secured. The cam 67 has on its periphery a double contact path 71 which has in the area of a sliding contact arm 73 an insulated portion 72, whilst a second sliding contact arm 74 at least in the last portion of the cam movement can have continuous metallic contact.

The indicated position of the arrangement in FIGURE 4 corresponds to the state shortly before an action. The arm 66 lies directly at the end of the cam 67 and presses a contact strip 75 against the contact strip 74 so that the corresponding contacts 74a and 75a are closed. The motor current circuit is accordingly interrupted only at the insulated position 72. Parallel with the contact strips 73, 74 there is a switch contact 76 and hand release contact 77 which is closed by means of a rod 78 by operating of the manual control 79. The arrangement is accordingly made in such manner that the contact 77 is already closed by the first movement of the manual control 79. A further movement of the manual control 79 is prevented by the stop of the rod 78. On the other hand the release rod 25 is only in loose spring contact with the manual control 79, so that it can be disconnected therefrom, in order to operate the diaphragm shutter.

If one of the two contacts 76 or 77 is closed manually, the insulated area 73 is bridged over and the motor starts running. The arm 66 slides off the cam 67. The contact spring 75 which has been pressed thereon by the arm 66 is released but is immediately brought up against an abutment 83, the motor current circuit is interrupted, so that the winding motion and the rotation of the cam 67 after a short run immediately stops. The release arm 65 moves during this time interval to the left due to the spring 64 over the curved portion 80 of the relaease extension rod 68 and pulls the latter together with the release rod 25 into the release position. If the exposure time is relatively long, the rod 65 is released but does not go into its end position catching with a slightly inclined lug 81 on a bolt 82 (FIGURE 5, dotted position) which (in a manner not illustrated) is vertically moved upward when the diaphragm of the camera 1 is again fully closed or when the diaphragm mechanism is returned to its zero position. The bolt 82 accordingly projects into the main housing 1 and is there connected with a member (not illustrated) belonging to the diaphragm mechanism. If necessary it can be arranged to be folded in the same fashion as the rod 68 on the rod 25. The motor current circuit during this process is still interrupted.

If the diaphragm is again closed and the lug 81 accordingly is released the rod 65 moves into the position illustrated in FIGURE 5. This also is valid naturally for a short exposure time in which the bolt 82 is never touched.

In the position of FIGURE 5 the contact spring 73 is bent so far by a horizontal arm 84 of the rod 65 that the contacts 74a, 75a are again closed whilst the arm 66 is positioned close to the starting point of the next curved portion of the cam 67.

Simultaneously or slightly earlier or later the contact finger of the spring 73 slides off the cam 67 and causes the contact spring 73 to close a fixed contact 85 which is electrically connected with the contact spring 74. In this instant the connection between 73 and 74 again is made and the entire resulting operational course of the manual action is removed. A short contact closure of the switch 76 or 77 is sufficient for operation.

The motor 8 now is running and acts in such manner that the cam 67 releases the contact finger of the spring 74. The contacts 74a, 75a are closed by the power of the spring 74 which tends to urge to the left. The arm 84 is released from the pressure, arm 66 lies at the start of the cam surface which will displace same together with the rod 65 increasingly to the right. The arm 84 is lifted completely away from the spring 74 and the arm 81 gradually comes out of the range of the bolt 82 (see FIGURE 7). Arm 66 contacts spring 75 and lifts same off the stop 83 (FIGURE 7) whereby spring 74 also is lifted slightly. Eventually the contact fingers 73 and 74 again slide on the contact path of cam 67 and thus are electrically connected whereby contact 85 is interrupted by the lifting of the contact finger 73 until said finger 73 reaches the insulated area 72 at the curved end of the cam 67 whereby the motor is switched off. The camera again is ready for the next operation.

If a series of photographs are to be made, either the contact 76 or the contact 77 (through the manual release 79) is kept closed. The cycle of operation then is repeated as frequently as desired. At each opening of the switch contacts 76, 77, the drive still runs entirely to the end of the run of the cam 67 or to the release position.

FIGURE 8 shows a modification of the examples of FIGURES 4 to 7 in which only one sliding path is required on the cam 67. In this case the control arm 65, consisting of insulating material or provided with suitable intermediate insulation, has a metallic part 86 which serves as the second contact path. Accordingly the contact spring 87, which corresponds to the contact spring 73 in FIG. 4 abuts, during the last part of the winding operation against the metallic part 86. The contact finger 74 slides over the single sliding path 88 which has an interrupting area 89 at its end. The contact spring 87 is electrically insulated from the contact spring 75 but is mechanically connected with it so that both are moved together by the control arm 65. FIGURE 8 again shows the position shortly before operation. The contact arms 66, 86 have reached the insulated area 89 whereby the motor circuit is interrupted. If the manual control switches 76, 77 now are closed, the motor again starts running until the arm 65, 66 is released from the cam 67 and springs into the release position. At this moment the contact 74, 75 is opened. The motor stops and the release is completed as described before.

The sliding path 88 must extend sufficiently rearwardly so that the contact 86, 88 is made before the contact 90 is open. The switches 76, 77 as well as the contact spring 74, 87 are bridged by the contact 90, so that after a completed operation and closing of the contacts 74a, 75a, the cycle of operation is in each case brought to an end, also if the contacts 76, 77 were only actuated for a very short time. Everything else corresponds to the examples of FIGURES 4 to 7.

The actual arrangement of the contacts and the mechanical transmission means can be carried out according to FIGURE 9. Since it is also desirable for reasons of space to arrange the contact springs parallel to the longitudinal side of the camera cross-section, it is preferable as shown in FIGURE 9 to connect the control arm 65 by means of a bell crank lever 65b to a rod 65a which is in engagement with the contact springs 74, 75 and 87.

We claim:

1. A camera having, in combination, film spool winding means, an electric motor, remote control means connected with said electric motor for simultaneously controlling the film transfer and shutter operation, a film spool winding drive mechanism connecting said electric motor and said film spool winding means, a mechanical hand-operated shutter release means, mechanical actuator means operatively connecting said film spool winding drive mechanism and said shutter release means, and a plurality of electric contact means combined with said electric motor and said mechanical actuator means said mechanical actuator means comprising a movable switch lever operatively connected with certain of said plurality of electric contact means, said film spool winding drive mechanism comprising a rotatable cam member contacting and adapted to move said movable switch lever, said movable switch lever cooperating with certain of said plurality of electric contact means to control rotation of said motor and said cam member whereby said film spool winding drive mechanism and said shutter release may be actuated by either said mechanical hand-operated shutter release means or said remote control means.

2. A camera, according to claim 1, said film spool winding drive mechanism having a crown wheel, said cam member being secured to said crown wheel, said crown wheel having two pins for engaging a rapid film spool winding key of said camera, said key making approximately one-half of one revolution for effecting the winding and tensioning movement.

3. A camera, according to claim 1, said electric motor and said film spool winding mechanism having a casing, said casing having a raised edge, two slots in the longitudinal sides thereof and a milled disc projecting over said casing, said disc connecting by a screw bolt said casing firm with said camera.

4. A camera, according to claim 1, said plurality of electric contact means including means by which said shutter release and film spool winding operations are continuously repeated as long as said remote electric contact means are closed, and by which said camera is brought into the position for a subsequent shutter release when said remote electric contact is opened.

5. A camera, according to claim 2, and wherein said switch lever being pivotally and longitudinally displaceably mounted, has a slot and pin and a spring operating said switch lever in one direction, and wherein said cam member coupled with the winding drive has a step engaged by said switch lever, one end of said switch lever sliding laterally on the circumference of said cam member and in the reverse movement of said winding drive being displaced to its other end position, in which it is held until winding starts and said switch lever is moved so far on the periphery of said cam member that the edge of said switch lever comes out of engagement and said switch lever is moved back under the influence of said spring.

6. A camera according to claim 1, and having a rocking arm engaging said connecting rod, said rocking arm operatively connected with said switch lever and being arranged for closing one of said plurality of electric contact means which is arranged in parallel with a remote switch contact means.

7. A camera according to claim 6, said rocking arm having a spring and a guide slot for engaging with said connecting rod.

8. A camera according to claim 2, said cam member operatively connected to a spring for storing mechanical power during the operation of said winding drive mechanism, said mechanical power being released at the end of the operation of said cam member, and a control arm for switching off said electric motor, said control arm being actuated by said spring.

9. A camera according to claim 8, and having a diaphragm and a bolt on said diaphragm and wherein the movement of said control arm is trapped by said bolt in a long exposure time, said bolt being operated by the closing of said diaphragm of said camera and being arranged to release said control arm when said diaphragm is closed.

10. A camera according to claim 8 and having a metallic double sliding path on said cam member providing for electrical connection of two sliding contacts which are connected in parallel in the motor circuit to an electrical remote switch contact to which a further closed contact is connected in parallel by mechanical actuation, said double sliding path having an interrupted part which causes an interruption of the motor circuit shortly before the release of said control arm.

11. A camera according to claim 8, and comprising a pair of contact springs arranged in parallel with said remote switch contact means, one of said contact springs sliding on a contact path of said cam disc serving simultaneously for mechanical operation of said control arm and for electric connection by means of a contact surface of said control arm with a second contact spring lying against said same contact surface, said contact surface reaching an insulated position shortly before the end of the curved path of said disc, whereby said electric motor is switched on and said control arm is operated.

12. A camera according to claim 1, said mechanical hand operated shutter release means having a mechanical release finger operatively connected to said mechanical actuator means and a stop means for said release finger, said stop means arranged in such manner that only the electric contact in a first part of the release movement can be operated by hand, while the further release operation automatically ends and the further hand operation is stopped so that a series of photographs is possible both by said remote contact means and by continued pressing of said release finger.

13. A camera according to claim 1, and wherein said cam means has an edge formed on the surface thereof, and wherein said switch lever comprises means for altering the position of said switch lever, said means being operated by the reversal of the direction of rotation of said electric motor, so that said switch lever after having operated said shutter release means by said cam means and said connecting rod is held in its new position by said edge on said surface of said cam, until a new cycle of the shutter release operation is prepared by the winding of said film spool.

References Cited in the file of this patent

UNITED STATES PATENTS

| | | |
|---|---|---|
| 2,795,175 | Foster | June 11, 1957 |
| 3,005,377 | Brault | Oct. 24, 1961 |

FOREIGN PATENTS

| | | |
|---|---|---|
| 899,000 | France | July 24, 1944 |
| 1,007,616 | Germany | May 2, 1957 |
| 1,027,981 | Germany | Apr. 10, 1958 |
| 1,042,376 | Germany | Oct. 30, 1958 |